United States Patent
Wang et al.

(10) Patent No.: US 10,658,703 B2
(45) Date of Patent: May 19, 2020

(54) NEGATIVE ELECTRODE PLATE AND SECONDARY BATTERY COMPRISING THE SAME

(71) Applicant: Contemporary Amperex Technology Co., Limited, Ningde, Fujian (CN)

(72) Inventors: Jiazheng Wang, Ningde (CN); Meng Kang, Ningde (CN); Tianquan Peng, Ningde (CN); Yuliang Shen, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/199,240

(22) Filed: Nov. 26, 2018

(65) Prior Publication Data
US 2019/0097271 A1 Mar. 28, 2019

(30) Foreign Application Priority Data

May 16, 2018 (CN) .......................... 2018 1 0469061

(51) Int. Cl.
| | |
|---|---|
| *H01M 4/13* | (2010.01) |
| *H01M 10/0583* | (2010.01) |
| *H01M 4/04* | (2006.01) |
| *H01M 4/587* | (2010.01) |
| *H01M 4/133* | (2010.01) |
| *H01M 4/66* | (2006.01) |
| *H01M 10/04* | (2006.01) |
| *H01M 4/02* | (2006.01) |

(52) U.S. Cl.
CPC ..... *H01M 10/0583* (2013.01); *H01M 4/0404* (2013.01); *H01M 4/133* (2013.01); *H01M 4/587* (2013.01); *H01M 4/667* (2013.01); *H01M 10/045* (2013.01); *H01M 2004/027* (2013.01)

(58) Field of Classification Search
CPC ........... H01M 10/0583; H01M 10/045; H01M 4/0404; H01M 4/133; H01M 4/587; H01M 4/667; H01M 2004/027
See application file for complete search history.

(56) References Cited

U.S. PATENT DOCUMENTS

| | | | |
|---|---|---|---|
| 2009/0130561 A1* | 5/2009 | Matsumoto | ........... C04B 35/522 |
| | | | 429/231.8 |
| 2011/0171532 A1 | 7/2011 | Okanishi et al. | |
| 2014/0057166 A1 | 2/2014 | Yokoyama et al. | |

FOREIGN PATENT DOCUMENTS

| | | |
|---|---|---|
| CN | 101087017 A | 12/2007 |
| CN | 104106160 A | 10/2014 |
| CN | 106601994 A * | 4/2017 |

OTHER PUBLICATIONS

Extended European Search Report for European Application No. 18208317.0,dated Apr. 8, 2019, 9 pages.
First Official Action and Search Report for Chinese Application No. 201810469061.0, dated Feb. 25, 2019, 7 pages.

\* cited by examiner

*Primary Examiner* — Jane J Rhee
(74) *Attorney, Agent, or Firm* — Law Offices of Liaoteng Wang

(57) ABSTRACT

The disclosure relates to a negative electrode plate and a secondary battery comprising the same. Specifically, the disclosure provides a negative electrode plate comprising a negative electrode current collector and a negative electrode layer coated on at least one surface of the negative electrode current collector, the negative electrode layer comprising a negative electrode active material, wherein the negative electrode active material comprises graphite, and the negative electrode layer meets: $4 \times L \times V_{OI} - \frac{1}{4} \times Dn10 \leq 25$, wherein L represents the thickness of single-side negative electrode layer on the negative electrode current collector in millimeter; Dn10 represents the particle diameter corresponding to 10% of the number distribution of particles of the negative electrode active material in micrometer; $V_{OI}$ represents the orientation index of the negative electrode layer. The negative electrode plate can allow that a secondary battery containing the same has the combination of high energy density, fast charge, and long cycle life.

14 Claims, No Drawings

NEGATIVE ELECTRODE PLATE AND SECONDARY BATTERY COMPRISING THE SAME

CROSS-REFERENCE TO RELATED APPLICATION

This application claims priority to Chinese Patent Application No. 201810469061.0, filed on May 16, 2018, which is hereby incorporated by reference in its entirety.

TECHNICAL FIELD

The disclosure belongs to the field of electrochemical technology. More particularly, the disclosure refers to a negative electrode plate for a secondary battery and the secondary battery.

BACKGROUND

New energy vehicles represent the direction of industrial development of the world's vehicles. As a new rechargeable battery having high-voltage and high energy density, lithium ion secondary battery has prominent features such as light weight, high energy density, no pollution, no memory effect, and long service life and thus is widely used in new energy vehicles.

Nevertheless, relatively long charging time is one of the important factors that limit the rapid popularization of new energy vehicles. Based on the technical principle, the negative electrode has a great influence on the fast charge performance of the battery. At present, the fast rechargeable battery developed in the industry mainly consists of lithium titanate and amorphous carbon. Although they have relatively good rate performance, the batteries comprising the above two negative electrodes have relatively low energy density and thus cannot meet the customer's demand.

In view of the above, it is necessary to provide a negative electrode plate which can solve the above problems, have a relatively high charging speed while maintaining a relatively high energy density and a relatively long cycle life.

SUMMARY

It is one object of the present invention to provide a negative electrode plate having long cycle life and fast charge properties and the like for use in battery.

It is a further object of the present invention to provide a secondary battery having high energy density, fast charge, long cycle life and the like.

In order to achieve the above object, the first aspect of the present disclosure provides a negative electrode plate, comprising a negative electrode current collector and a negative electrode layer coated on at least one surface of the negative electrode current collector, the negative electrode layer comprising negative electrode active material, wherein the negative electrode active material comprise graphite material, and the negative electrode plate fulfills the condition:

$$4 \times L \times V_{OI} - \frac{1}{4} \times Dn10 \leq 25 \quad \text{formula I)}$$

$$\text{preferably, } 0.2 \leq 4 \times L \times V_{OI} - \frac{1}{4} \times Dn10 \leq 16 \quad \text{formula II)}$$

wherein

L represents the thickness of single-side negative electrode layer on the negative electrode current collector in millimeter, Dn10 represents the particle diameter that corresponds to 10% of the number distribution of particles of the negative electrode active material in micrometer;

$V_{OI}$ represents the OI value of the negative electrode layer.

Preferably, 0.01 mm ≤ L ≤ 0.3 mm, further preferably 0.015 mm ≤ L ≤ 0.15 mm.

Preferably, $1 \leq V_{OI} \leq 200$, further preferably $2 \leq V_{OI} \leq 120$.

Preferably, Dn10 ≤ 8 μm, further preferably Dn10 ≤ 6 μm.

Preferably, the single side of the negative electrode layer has a coating weight CW per unit area of 2 mg/cm² ≤ CW ≤ 18 mg/cm², further preferably 4 mg/cm² ≤ CW ≤ 10 mg/cm².

In another aspect, the disclosure also provides a secondary battery, comprising the negative electrode plate according to the first aspect of the present disclosure.

DETAILED DESCRIPTION

Negative electrode plate used for a secondary battery such as a lithium ion battery is generally composed of a negative electrode current collector and a negative electrode layer coated on at least one surface of the negative electrode current collector, wherein the negative electrode layer contains a negative electrode active material and an optional additive.

Through extensive research, the inventors have found that some parameters of the negative electrode active material and the negative electrode layer take different influences on the energy density and fast charge capacity of the battery; and that when an electrode plate is designed, in case special designs are made for these parameters it is possible to obtain a negative electrode plate and a secondary battery which have both high energy density and fast charging characteristics.

Theoretically, the electrochemical process that occurs in a negative electrode plate during charging can be roughly divided into 3 steps:

1) Liquid phase conduction (including liquid phase diffusion and electromigration) of ions within the porous negative electrode;
2) Charge exchange of ions on the surface of negative electrode active material;
3) Solid phase conduction of ions within the particles of negative electrode active material.

Through a large number of experiments, the inventors have found that the liquid phase diffusion of ions is very important for achieving a large charging rate, and further found that liquid phase transportation is mainly affected by the following three key parameters:

a) The thickness L of the active material layer (i.e., the negative electrode layer). The thickness of the negative electrode layer is related to the intercalating speed of the active ions and the polarization of the negative electrode. Therefore, the thickness of the negative electrode layer will influence the kinetic performance and cycle performance of the negative electrode plate. Generally, the thicker the active material layer, the more difficult the liquid phase diffuses under the same conditions.

b) The OI value of the negative layer (i.e., $V_{OI}$). The more the active reaction sites in the negative electrode layer, the faster the charge exchange rate between active ions and electrons on the surface of the negative electrode active material during charging, the better the kinetic performance of the battery, and the higher the rate of the charging speed. The active reaction sites in the negative electrode active material layer can be characterized by the OI value of the negative electrode layer. Generally, the smaller the OI value of the negative electrode layer, the more the end faces available for the deintercalation of the active ions in the negative electrode layer, and the more active reaction sites the negative electrode active material layer have.

c) The continuity of the porous channel. When the other conditions are the same, the more amount of the fine powders (fine particles) in the active material of the negative electrode layer would result in the greater probability of blocking the porous channel, and the more difficult diffusion of the liquid phase.

In particularly, the inventors have found that when a battery is designed, the fast charge performance of secondary battery can be improved without significantly reducing the energy density or cycle life, if the distribution Dn10 of particles of the negative electrode active material, the OI value of the negative electrode layer (i.e., $V_{OI}$) and the thickness L of the negative electrode layer fulfill a specific condition. Specifically, secondary battery can have a good fast charge performance without significantly reducing the energy density or cycle life, when a negative electrode active material of the negative electrode plate comprises graphite material and the negative electrode plate fulfills the condition, $$4 \times L \times V_{OI} - \tfrac{1}{4} \times Dn10 \leq 25 \qquad \text{formula I)}.$$

For convenience, a kinetic parameter D is defined as $D = 4 \times L \times V_{OI} - \tfrac{1}{4} \times Dn10$. The parameter D can characterize the difficulty of in the liquid phase conduction of ions in the negative electrode plate.

The above formula I is summarized by the inventors through a large number of experimental studies. The inventors have found, only when the negative electrode plate is designed so that the D value is not more than 25, the battery can have both fast charge and fast release performance and long cycle life at the same time. Generally, the smaller the D value, the better the fast charge performance. However, in view of limitations in other process steps, the D value is typically not less than 0.01, further preferably, not less than 0.05, and more preferably, $0.2 \leq D \leq 16$.

Under comprehensive consideration, in order to improve other properties of battery, the values of L, $V_{OI}$ or Dn10 are generally controlled in the following preferred ranges: 0.01 mm≤L≤0.3 mm, preferably 0.015 mm≤L≤0.15 mm; $1 \leq V_{OI} \leq 200$, further preferably $2 \leq V_{OI} \leq 120$; Dn10≤8 μm, preferably Dn10≤6 μm.

The inventors have further found that the coating weight CW per unit area of the single side of the negative electrode plate has a certain influence on the performance of the battery. In general, the larger CW, indicating more active material loaded on the current collector per unit area, results in the greater energy density of the battery assembled under the same conditions. However, the larger CW will also influence the fast charge performance. This is because the larger CW would cause a larger thickness of the layer which requires more adhesives in the coating process, thereby resulting in the worse conductivity of the plate. On the other hand, the fast charging of the battery at a higher rate tends to cause the powders falling off from the thick coating, thereby affecting the cycle performance of the battery. Therefore, under the proviso that the D value satisfies D≤25 (preferably $0.2 \leq D \leq 16$), CW also has a preferred range. Preferably, 2 mg/cm²≤CW≤18 mg/cm², more preferably, 4 mg/cm²≤CW≤10 mg/cm².

The negative electrode active materials used in the negative electrode layer of the present disclosure are materials commonly used in the art. Methods of preparing these materials are well known and commercially available. The present disclosure focuses on how to choose the suitable parameters of raw materials and of negative electrode layer in which they reasonably match with each other, thereby achieving the good technical effect of the present invention.

The parameters used for the negative electrode layer and the negative electrode active materials in the Formula I) of the disclosure have the common meanings well known in the art. L represents the thickness of single-side negative electrode layer on the negative electrode current collector in millimeter; $V_{OI}$ represents the orientation index of the negative electrode layer; Dn10 represents the particle diameter that corresponds to 10% of the number distribution of particles of the negative electrode active material in micrometer. The parameters mentioned above can be measured by methods well known in the art. For example, testing can be performed in accordance with the methods given in the Examples section herein.

The negative electrode plate in the present disclosure can be prepared by methods well known in the art. Typically, the negative electrode active material is mixed with materials such as optional conductive agent (such as metal particles and carbon materials, like carbon black), binder (such as SBR), and other optional additives (such as PTC thermistor material), and then dispersed in solvent (such as deionized water). Upon uniformly stirring, the mixture is uniformly coated on the negative electrode current collector. After drying, a negative electrode plate containing the negative electrode layer is obtained. As the negative electrode current collector, a material for example a metal foil, such as copper foil, or a porous metal plate can be used. Copper foil is preferably used.

Notably, in the preparation of the negative electrode plate, the negative electrode current collector may be coated on both sides or on single side. Regardless of coating on both sides or on single side, it is within the scope of the present invention if the negative electrode layer on either side of the negative electrode current collector satisfies the requirements of Formula I).

It should be noted that the OI value of the negative electrode layer in the present disclosure can be controlled by adjusting the following parameters.

First, both the average particle diameter D50 of the negative electrode active material and the OI value (defined as $G_{OI}$) of the powder have a certain influence on the OI value of the negative electrode layer; the higher the D50 of the negative electrode active material, the higher the OI value of the negative electrode layer, the higher the powder OI value of the negative electrode active material, the OI value of the negative electrode layer.

Second, in the preparation of a battery, the magnetic field inducing technology can be introduced in the coating process to artificially induce the arrangement of the negative electrode active material on the current collector, thereby changing the OI value of the negative electrode layer. The arrangement of the negative electrode active material may also be controlled by adjusting the press density PD of the negative electrode layer in the cold pressing step, thereby controlling the OI value of the negative electrode layer.

Preferably, the average particle diameter D50 of the negative electrode active material is in the range of 0.5 μm≤D50≤20 μm, preferably 3 μm≤D50≤15 μm.

Preferably, the powder OI value $G_{OI}$ of the negative electrode active material is in the range of $0.5 \leq G_{OI} \leq 7$, preferably $2 \leq G_{OI} \leq 4.5$.

Preferably, the press density of the negative electrode layer is in the range of 1.0 g/cm³≤PD≤2.1 g/cm³, preferably 1.3 g/cm³≤PD≤1.7 g/cm³.

The negative electrode active material used in the negative electrode layer according to the disclosure comprises graphite material. The graphite material may be selected from at least one of artificial graphite and natural graphite. In one embodiment, in addition to graphite material, the negative electrode active material may also comprise one or more of soft carbon, hard carbon, carbon fiber, mesocarbon microbead, silicon-based material, tin-based material, lithium titanate.

The silicon-based material may be selected from one or more of elemental silicon, silicon oxide, silicon carbon composite, silicon alloy. The tin-based material may be selected from one or more of elemental tin, tin oxide compound, tin alloy Furthermore, in an embodiment wherein the negative electrode active material is a mixture, the graphite material generally constitutes higher than 50%, preferably higher than 60%, 65%, 70%, 75%, 80%, 85%, 90%, or 95% by weight of the negative electrode active material.

In addition, in order to further improve the cycle stability and/or rate performance of the negative electrode active material, coating on the surface of the negative electrode active material is the most common and effective method. For example, the surface coating layer of the negative electrode active material may be one or more of soft carbon, hard carbon, lithium titanate, silicon-based material, and conductive carbon. The amount of the coating material is from 1% to 20%, preferably from 1% to 10% of the coated graphite material.

In another aspect, the present disclosure provides a secondary battery, comprising the negative electrode plate according to the first aspect of the disclosure.

Except use of the negative electrode plate of the disclosure, the construction and the preparation method of the secondary battery of the disclosure are well known. Generally, a secondary battery is mainly composed of a positive electrode, a negative electrode, a separator, and an electrolyte, wherein the positive and negative electrodes are immersed in the electrolyte, and the ions in the electrolyte as a medium are moved between the positive and negative electrodes to realize charging and discharging of the battery. In order to avoid short circuit between the positive and negative electrodes through the electrolyte, it is necessary to separate the positive and negative electrodes with a separator. The shape of the secondary battery may have an aluminum shell as a casing, or may be a soft package battery.

It should be noted that the battery according to another aspect of the present application may be a lithium ion battery, a sodium ion battery, and any other battery using the negative electrode plate of the first aspect of the present disclosure.

Specifically, when the battery is a lithium ion battery:

The positive electrode plate comprises a positive electrode current collector and a positive electrode layer disposed on the surface of the positive electrode current collector, wherein the positive electrode layer comprises a positive electrode active material, and the positive electrode active material may be selected from the group of lithium cobalt oxide, lithium nickel oxide, lithium manganese oxide, and lithium nickel manganese oxide, lithium nickel cobalt manganese oxide, lithium nickel cobalt aluminum oxide, transition metal phosphate, etc. However, the present application is not limited to these materials, and other conventionally known materials that can be used as a positive electrode active material of a lithium ion battery may also be used. These positive electrode active materials may be used alone or in combination of two or more.

Specifically, when the battery is a sodium ion battery:

The positive electrode plate comprises a positive electrode current collector and a positive electrode layer disposed on the surface of the positive electrode current collector, wherein the positive electrode layer comprises a positive electrode active material, and the positive electrode active material may be selected from the group of sodium iron composite oxide ($NaFeO_2$), sodium cobalt composite oxide ($NaCoO_2$), sodium chromium composite oxide ($NaCrO_2$), sodium manganese composite oxide ($NaMnO_2$), sodium nickel composite oxide ($NaNiO_2$), sodium nickel titanium composite oxide ($NaNi_{1/2}Ti_{1/2}O_2$), sodium nickel manganese composite oxide ($NaNi_{1/2}Mn_{1/2}O_2$), sodium iron manganese composite oxide ($Na_{2/3}Fe_{1/3}Mn_{2/3}O_2$), sodium nickel cobalt manganese composite oxide ($NaNi_{1/3}Co_{1/3}Mn_{1/3}O_2$), sodium iron phosphate compound ($NaFePO_4$), sodium manganese phosphate compound ($NaMnPO_4$), sodium cobalt phosphate compound ($NaCoPO_4$), Prussian blue materials, polyanionic materials (phosphate, fluorophosphate, pyrophosphate, sulfate) and the like. However, the present application is not limited to these materials, and other conventionally known materials that can be used as a positive electrode active material of a sodium ion battery may also be used. These positive electrode active materials may be used alone or in combination of two or more.

In the battery of another aspect of the disclosure, the particular types and the constitution of the separator and the electrolyte are not specifically limited, and may be selected depending on the actual needs.

Specifically, the separator may be selected from the group consisting of a polyethylene layer, a polypropylene layer, a polyvinylidene fluoride layer, and a multilayer composite layer thereof.

When the battery is a lithium ion battery, as nonaqueous electrolyte, a lithium salt solution dissolved in an organic solvent is generally used. Lithium salt is an inorganic lithium salt, such as $LiClO_4$, $LiPF_6$, $LiBF_4$, $LiAsF_6$, $LiSbF_6$ and the like, or organic lithium salt, such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3 (n \geq 2)$. The organic solvent used in nonaqueous electrolyte is a cyclic carbonate, such as ethylene carbonate, propylene carbonate, butylene carbonate or vinylene carbonate and the like; a chain-like carbonate, such as dimethyl carbonate, diethyl carbonate or methyl ethyl carbonate and the like; a chain-like ester such as methyl propionate and the like; cyclic ester such as γ-butyrolactone and the like; a chain-like ether, such as dimethoxyethane, diethyl ether, diethylene glycol dimethyl ether, and triethylene glycol dimethyl ether and the like; a cyclic ether, such as tetrahydrofuran, 2-methyltetrahydrofuran and the like; a nitrile, such as acetonitrile, propionitrile and the like; or a mixture of these solvents.

Hereinafter, a lithium ion secondary battery will be used as an example for briefly illustrating the structure and preparation method of the secondary battery of the present disclosure.

First, a battery positive electrode plate is prepared in accordance with a conventional method in the art. The positive electrode active material used for the positive electrode plate is not limited in the present disclosure. Usually, in the above positive electrode active material, it is necessary to add a conductive agent (for example, carbon materials, like carbon black), a binder (for example, PVDF), or the like. If needed, other additives such as PTC thermistor materials and the like may also be added. These materials are usually mixed and dispersed in a solvent (for example, NMP), and after uniformly stirring, the mixture is uniformly coated on a positive electrode current collector, and dried to obtain a positive electrode plate. As the positive electrode current collector, a material for example a metal foil, such as aluminum foil, or a porous metal plate can be used. Aluminum foil is preferably used.

Then, the negative electrode plate of the present disclosure is prepared as described above.

Finally, the positive electrode plate, the separator, the negative electrode plate are stacked in order, so that the separator is positioned between the positive and the negative electrode plates for the purpose of separation, then wound to obtain a bare battery cell. The bare battery cell is placed in the outside casing, and dried. Then the electrolyte is injected. After vacuum encapsulation, standing, formation, shaping, and the like, a secondary battery is obtained.

The present disclosure can allow a secondary battery having an improved fast charge performance without reducing the cycle life and/or energy density, as compared with the conventional negative electrode plate. Furthermore, the disclosure allows a secondary battery having high energy density, fast charge property, long cycle life and the like. Therefore, it is of great significance for the fields of such as new energy vehicles.

Advantageous effects of the present invention will be further described below in conjunction with the examples.

EXAMPLES

In order to make the objects, the technical solutions and the beneficial technical effects of the present disclosure more clear, the present disclosure will be further described in details with reference to the examples below. However, it is to be understood that the examples of the present disclosure are not intended to limit the invention, and the embodiments of the disclosure are not limited to the examples set forth herein. The specific experimental conditions or operating conditions are not specified in the examples, and the examples are usually prepared according to the conditions recommended by the material supplier.

I. Preparation Method of the Testing Battery

The batteries of Examples 1-22 and Comparative Examples 1-2 were prepared by the following methods.

A) Preparation Method of the Positive Electrode Plate:

The positive electrode active material NCM523 ($LiNi_{0.5}Co_{0.2}Mn_{0.3}O_2$), a conductive agent (Super P), a binder (PVDF), etc. were mixed at a ratio of 96:2:2. After addition of a solvent (NMP), the mixture was stirred under a vacuum stirrer until the system was uniformly transparent, yielding a positive electrode slurry. The positive electrode slurry was uniformly coated on the aluminum foil of the positive electrode current collector. The positive electrode current collector coated with the positive electrode slurry was air-dried at room temperature, transferred to an oven for drying, and then subjected to cold pressing and slitting to obtain a positive electrode plate.

B) Preparation Method of the Negative Electrode Plate:

The negative electrode active material of graphite or a mixture of graphite with other active materials in varying ratios, a thickening agent (carboxymethyl cellulose), a binder (SBR), etc. were mixed at a ratio of 95:2:3. The mixture was uniformly mixed with solvent (deionized water) under a vacuum stirrer to prepare a negative electrode slurry. The negative electrode slurry was uniformly coated on the copper foil of the negative electrode current collector. The negative electrode current collector coated with the negative electrode slurry was air-dried at room temperature, transferred to an oven for drying, and then subjected to cold pressing and slitting to obtain a negative electrode plate.

C) Preparation Method of Electrolyte:

Ethylene carbonate (EC), ethyl methyl carbonate (EMC), and diethyl carbonate (DEC) were mixed at a volume ratio of 1:1:1. Then the sufficiently dried lithium salt $LiPF_6$ was dissolved at a ratio of 1 mol/L in a mixed organic solvent, to prepare an electrolyte solution.

D) The Preparation Method of Separator:

A 12 micron polyethylene layer was chosen.

E) Assembly of the Battery:

The positive electrode plate, the separator and the negative electrode plate were stacked in order, so that the separator is positioned between the positive and negative electrodes for the purpose of separation, and then wound to obtain a bare battery cell. The bare battery cell was placed in the outer casing. The prepared electrolyte solution was injected into the dried bare battery cell. After vacuum encapsulation, standing, formation, shaping, and the like, a lithium ion secondary battery is obtained.

II. Negative Electrode Active Material and Measurement of the Parameters of Negative Electrode Plate 1) Dn10 of the negative electrode active material: The particle size distribution was measured using a laser diffraction particle size distribution measuring instrument (Malvern Mastersizer 3000), thereby obtaining Dn10.

2) The thickness L of the single-side negative electrode layer: The thickness L of the single-side negative electrode layer may be measured by using 1/10 micrometer. It is to be noted that the thickness of the negative electrode layer as describe in the present disclosure means the thickness of the negative electrode layer used for assembling the battery after being compacted by cold pressing.

3) The OI value of the negative electrode layer: By using an X-ray powder diffractometer (X'pert PRO) according to the X-ray diffraction analysis method and the lattice parameter determination method of graphite JIS K 0131-1996, JB/T4220-2011, X-ray diffraction spectrum was obtained. Then, the orientation index value of the negative electrode layer can be calculated according to $V_{OI}=C_{004}/C_{110}$, wherein $C_{004}$ was the peak area of the 004 characteristic diffraction peak, and $C_{110}$ is the peak area of the 110 characteristic diffraction peak.

4) The coating weight CW per unit area on single side: The negative electrode current collector was weighed before coating with the negative electrode slurry, and the weight W0 (unit: mg) was recorded. After curing of the coated layer, the total weight W1 (unit: mg) of the electrode was measured again, and the area S (unit: $cm^2$) of coated layer was measured. Then the CW value was calculated according to the formula L=(W1−W0)/S.

III. Testing the Performance of the Battery

1) Kinetic Performance (Fast Charge Performance)

The lithium ion batteries prepared in Examples and Comparative Examples were fully charged at a 4 C rate and fully discharged at a 1 C rate at 25° C. This procedure was repeated ten times. Then the lithium ion batteries were fully charged at a 4 C rate, followed by disassembling the battery and visually inspecting the lithium precipitated on the negative electrode plate. The area of the lithium precipitated area of less than 5% was considered to be slight lithium precipitation. The area of the lithium precipitated area of greater than 40% was considered to be serious lithium precipitation.

2) Testing Cycle Performance:

At 25° C., the lithium ion batteries prepared in Examples and Comparative Examples were charged at a 3 C rate, discharged at a 1 C rate, until the capacity of the lithium ion batteries were attenuated to 80% of the initial capacity. The cycle times were recorded.

3) Testing the Actual Energy Density

The lithium ion batteries prepared in Examples and Comparative Examples were fully charged at a 1 C rate and fully charged at a 1 C rate at 25° C., and the actual discharge energy was recorded. The lithium ion batteries were weighed using an electronic balance at 25° C. The ratio of the actual discharge energy of a lithium ion battery 1 C to the weight of a lithium ion battery was the actual energy density of the lithium ion battery.

Wherein: when the actual energy density was less than 80% of the target energy density, the actual energy density of the battery was considered to be very low; when the actual energy density was greater than or equal to 80% of the target energy density and less than 95% of the target energy density, the actual energy density of the battery was considered to be low; when the actual energy density was greater than or equal to 95% of the target energy density and less than 105% of the target energy density, the actual energy density of the battery was considered to be moderate; when the actual energy density was greater than or equal to 105% of the target energy density and less than 120% of the target energy density, the actual energy density of the battery was considered to be high; when the actual energy density was 120% or more of the target energy density, the actual energy density of the battery was considered to be very high.

IV. The Testing Results of Examples and Comparative Examples

The batteries of Examples 1-22 and Comparative Examples 1-2 were prepared according to the above methods. The performance parameters were measured. The results were shown as below.

In Examples 1-11 and Comparative Examples 1-2, the influences of the coating layer thickness L of the negative electrode layer, the OI value ($V_{OI}$) of the negative electrode layer, and Dn10 of the negative electrode active material on the battery performance were examined under the same coating layer weight (CW) conditions. From the data of these Examples and Comparative Examples, it can be known that in order to obtain a battery having both good fast charge performance (i.e. no lithium precipitation or only slight lithium precipitation in the fast charge test) and cycle performance (i.e. the number of cycles is not less than 2000 times), it is necessary to match the thickness L of the negative electrode layer and the OI value ($V_{OI}$) of the negative electrode layer with Dn10 of the negative electrode active material, so that the kinetic parameter $D=4 \times L \times V_{OI} - \frac{1}{4} \times Dn10$ is not greater than 25. In Comparative Examples 1 and 2, the parameters of the negative electrode coating layer were not matched with Dn10, so that the D value was more than 25, resulting in serious lithium precipitation of the battery and the number of cycles of only more than about four hundred times and less than five hundred times. The D values of Examples 1 and 2 were close to the critical value of 25, and slight lithium precipitation occurred during the fast charge test, which was an acceptable level and the cycle performance was also good. In addition, it can be seen from Examples 4-9 that when $0.2 \leq D \leq 16$, the battery has no lithium precipitation, and have an excellent cycle life as well as the optimal overall performance. Therefore, in order to ensure the fast charge performance and cycle performance of the battery, it is necessary to ensure that D is not greater than 25; especially when $0.2 \leq D \leq 16$, the performance is optimal.

| No. | Negative electrode material | Thickness L of negative electrode layer (mm) | OI value of negative electrode layer ($V_{OI}$) | Dn10 (μm) | CW (mg/cm²) | D | Kinetic performance (4 C) | Cycle life (cycle) | Actual energy density |
|---|---|---|---|---|---|---|---|---|---|
| Example 1 | graphite | 0.1 | 64.5 | 3.2 | 8.0 | 25.0 | Slight lithium precipitation | 2810 | Moderate |
| Example 2 | graphite | 0.08 | 84.0 | 8 | 8.0 | 24.9 | Slight lithium precipitation | 2905 | Moderate |
| Example 3 | graphite | 0.06 | 85.0 | 1.6 | 8.0 | 20.0 | Slight lithium precipitation | 3213 | Moderate |
| Example 4 | graphite | 0.06 | 68.3 | 1.6 | 8.0 | 16.0 | No lithium precipitation | 3408 | Moderate |
| Example 5 | graphite | 0.06 | 50.8 | 0.8 | 8.0 | 12.0 | No lithium precipitation | 3307 | Moderate |
| Example 6 | graphite | 0.06 | 42.3 | 0.64 | 8.0 | 10.0 | No lithium precipitation | 3512 | Moderate |
| Example 7 | graphite | 0.05 | 35.0 | 4 | 8.0 | 6.0 | No lithium precipitation | 3204 | Moderate |
| Example 8 | graphite | 0.05 | 32.0 | 16 | 8.0 | 2.4 | No lithium precipitation | 3401 | Moderate |
| Example 9 | graphite | 0.05 | 3.0 | 1.6 | 8.0 | 0.2 | No lithium precipitation | 3609 | Moderate |
| Example 10 | graphite | 0.05 | 4.0 | 3 | 8.0 | 0.05 | No lithium precipitation | 2112 | Moderate |
| Example 11 | graphite | 0.05 | 3.8 | 3 | 8.0 | 0.01 | No lithium precipitation | 2025 | Moderate |
| Example 12 | graphite | 0.01 | 175.2 | 4 | 1.0 | 6.0 | No lithium precipitation | 3311 | Very low |
| Example 13 | graphite | 0.03 | 58.4 | 4 | 2.0 | 6.0 | No lithium precipitation | 3660 | Low |
| Example 14 | graphite | 0.03 | 58.4 | 4 | 4.0 | 6.0 | No lithium precipitation | 3717 | Moderate |
| Example 15 | graphite | 0.05 | 35.0 | 4 | 7.0 | 6.0 | No lithium precipitation | 3327 | Moderate |
| Example 16 | graphite | 0.08 | 22.0 | 4 | 10.0 | 6.0 | No lithium precipitation | 3208 | Moderate |
| Example 17 | graphite | 0.1 | 17.5 | 4 | 16.0 | 6.0 | No lithium precipitation | 2600 | High |
| Example 18 | graphite | 0.1 | 17.5 | 4 | 18.0 | 6.0 | No lithium precipitation | 2230 | Very high |
| Example 19 | graphite | 0.15 | 11.7 | 4 | 20.0 | 6.0 | Slight lithium precipitation | 1600 | Very high |
| Example 20 | graphite + soft carbon (7:3) | 0.05 | 35.0 | 4 | 8.0 | 6.0 | No lithium precipitation | 3560 | Moderate |
| Example 21 | graphite + hard carbon (7:3) | 0.05 | 35.0 | 4 | 8.0 | 6.0 | No lithium precipitation | 3350 | Moderate |
| Example 22 | graphite + Silicon oxide (7:3) | 0.05 | 35.0 | 4 | 8.0 | 6.0 | No lithium precipitation | 2900 | High |
| Comparative Example 1 | graphite | 0.06 | 116.3 | 3.6 | 8.0 | 27.0 | Serious lithium precipitation | 455 | Moderate |
| Comparative Example 2 | graphite | 0.08 | 127.8 | 3.6 | 8.0 | 40.0 | Serious lithium precipitation | 486 | Moderate |

In Examples 12-19, the influence of the coating weight CW per unit area of the negative electrode plate on the battery performance were examined under the conditions that the same graphite material was used (thus Dn10=4 μm remained constant) and the kinetic parameters D=4×L×$V_{OI}$-¼×Dn10 were maintained constant by modulating the coating process. From the obtained data, it can be seen that when D value is constant, the larger CW indicates more active material loaded on the current collector per unit area, resulting in the greater energy density of the battery. However, when the CW is too large, the fast charge performance is slightly decreased, and the cycle life is lowered. This is because the resulting thickness of the layer is very large and thus requires more adhesives in the coating process, thereby resulting in the worse conductivity of the plate. In addition, the fast charge and discharge tends to cause the powders falling off from the thick coating, thereby reducing the cycle performance of the battery. It can be seen from Examples 12 and 13, when CW<2, the energy density is very low, thus in view of the energy density, it is preferably to use CW≤12; from Examples 18 and 19, when CW>18, the number of cycles may be reduced to lower than 2000 times and slight lithium precipitation may also occur, thus in view of the fast charge performance and the cycle performance, it is preferably to use CW≤18. When 4≤CW≤10 (in Examples 14, 15, and 16), the battery performance is optimal, so the most preferable range of CW is 4≤CW≤10.

In Examples 20, 21, and 22 where graphite material and other commonly used negative electrode active materials (soft carbon, hard carbon, silicon oxide) were mixed as negative electrode active material while maintaining the kinetic parameter D in the most preferred range of 0.2≤D≤16, and CW in the most preferred range of 4≤CW≤10, the test data show that the respective batteries have good cycle performance, fast charge performance and relatively good energy density. This indicates, the parameters D and CW as defined in the disclosure are also applicable to the mixed negative electrode active material comprising graphite material.

As known from the data in the table, in order to improve the fast charge performance of the battery while maintaining an acceptable cycle performance of the battery, the parameter D must satisfy D≤25, preferably 0.2≤D≤16. Under the proviso that the parameter D satisfies such requirement, the overall performance of the battery will be further improved if the CW is also within the given range (2≤CW≤18, preferably 4≤CW≤10).

It is also to be understood that the above-described embodiments may be appropriately modified and varied by those skilled in the art in light of the above disclosure. Therefore, the present invention is not limited to the specific embodiments as disclosed and described above, and the modifications and variations of the disclosure are intended to fall within the scope of the appended claims. In addition, although some specifically defined terms are used in the specification, these terms are merely used for convenience of description and do not impose any limitation on the present invention.

The invention claimed is:

1. A secondary battery, comprising a negative electrode plate, the negative electrode plate comprising a negative electrode current collector and a negative electrode layer coated on at least one surface of the negative electrode current collector, the negative electrode layer comprising a negative electrode active material, wherein the negative electrode active material comprises a graphite material, and the negative electrode plate fulfills the condition:

$$0.2 \leq 4 \times L \times V_{OI} - \frac{1}{4} \times Dn10 \leq 25 \quad \text{formula I)}$$

and the negative electrode layer has a $V_{OI}$ value of 11.7≤$V_{OI}$≤68.3;

and the negative electrode active material has a Dn10 value of Dn10≤6;

wherein

L represents the thickness of single-side negative electrode layer on the negative electrode current collector in millimeter, Dn10 represents the particle diameter that corresponds to 10% of the number distribution of particles of the negative electrode active material in micrometer, $V_{OI}$ represents the OI value of the negative electrode layer.

2. The secondary battery according to claim 1, wherein the negative electrode plate fulfills the condition:

$$0.2 \leq 4 \times L \times V_{OI} - \frac{1}{4} \times Dn10 \leq 16 \quad \text{formula II)}$$

wherein

L represents the thickness of single-side negative electrode layer on the negative electrode current collector in millimeter, Dn10 represents the particle diameter that corresponds to 10% of the number distribution of particles of the negative electrode active material in micrometer, $V_{OI}$ represents the OI value of the negative electrode layer.

3. The secondary battery according to claim 1, wherein the graphite material is selected from one or more of artificial graphite and natural graphite.

4. The secondary battery according to claim 3, wherein the negative electrode active material further comprise one or more of soft carbon, hard carbon, carbon fiber, mesocarbon microbead, silicon-based material, lithium titanate.

5. The secondary battery according to claim 1, wherein the negative electrode layer has an L value of 0.05≤L≤0.08.

6. The secondary battery according to claim 5, wherein the negative electrode layer has an L value of 0.05≤L≤0.06.

7. The secondary battery according to claim 1, wherein the negative electrode layer has a $V_{OI}$ value of 17.5≤$V_{OI}$≤35.

8. The secondary battery according to claim 1, wherein the negative electrode active material has a Dn10 value of Dn10≤1.6.

9. The secondary battery according to claim 1, wherein the negative electrode active material has an average particle size D50 of 3 μm≤D50≤15 μm.

10. The secondary battery according to claim 1, wherein the negative electrode active material has a powder OI value $G_{OI}$ of 2.0≤$G_{OI}$≤4.5.

11. The secondary battery according to claim 1, wherein the negative electrode layer has a press density PD of 1.3 g/cm$^3$≤PD≤1.7 g/cm$^3$.

12. The secondary battery according to claim 1, wherein the single side of the negative electrode layer has a coating weight CW per unit area of 4 mg/cm$^2$≤CW≤10 mg/cm$^2$.

13. The secondary battery according to claim 1, wherein the secondary battery comprising a positive electrode plate, the positive electrode plate comprises a positive electrode current collector and a positive electrode layer disposed on the surface of the positive electrode current collector, the positive electrode layer comprises a positive electrode active material, and the positive electrode active material is one or more selected from lithium nickel cobalt manganese oxide, lithium nickel cobalt aluminum oxide.

14. The secondary battery according to claim 2, wherein the negative electrode plate fulfills the condition: 2.4≤4×L×$V_{OI}$-¼×Dn10≤6.

* * * * *